INVENTOR.
SAMUEL WEINER
BY
Ostrolenk & Faber
ATTORNEYS

INVENTOR.
SAMUEL WEINER
BY
Ostrolenk & Faber
ATTORNEYS

NON-LINEAR COMPENSATION CIRCUIT FOR COMMUTATING REACTORS

Filed Nov. 23, 1954

6 Sheets-Sheet 3

INVENTOR.
SAMUEL WEINER

BY

Ostrolenk & Faber

ATTORNEYS

Aug. 18, 1959 S. WEINER 2,900,529

NON-LINEAR COMPENSATION CIRCUIT FOR COMMUTATING REACTORS

Filed Nov. 23, 1954 6 Sheets-Sheet 4

INVENTOR.
SAMUEL WEINER

BY

Ostrolenk & Faber

ATTORNEYS

NON-LINEAR COMPENSATION CIRCUIT FOR COMMUTATING REACTORS

Filed Nov. 23, 1954 6 Sheets-Sheet 5

INVENTOR.
SAMUEL WEINER
BY
Ostrolenk & Faber
ATTORNEYS

INVENTOR.
SAMUEL WEINER
BY
Ostrolenk & Faber
ATTORNEYS

United States Patent Office 2,900,529
Patented Aug. 18, 1959

2,900,529

NON-LINEAR COMPENSATION CIRCUIT FOR COMMUTATING REACTORS

Samuel Weiner, Philadelphia, Pa., assignor to I-T-E Circuit Breaker Company, Philadelphia, Pa., a corporation of Pennsylvania Application November 23, 1954, Serial No. 470,705

6 Claims. (Cl. 307—88)

My invention relates to electrical circuits for compensating the non-ideal shape of the dynamic hysteresis loop of a saturable reactor and more particularly relates to reducing the magnetizing current of a commutating reactor used in a mechanical rectifier.

A mechanical rectifier produces unidirectional voltage by making metallic contact between a proper phase of an A.C. system and the associated D.C. system during the time interval the particular phase of the A.C. system is capable of delivering energy in the desired direction and breaking the metallic contact when the A.C. phase reverses its voltage in relationship to the D.C. voltage. This operation is performed sequentially and repeatedly in synchronism with the A.C. frequency.

The metallic contacts which perform the switching are switches which are able to carry the full current which flows through the rectifier. These contacts, when open, are able to withstand the full inverse voltage when the alternating voltage is opposed to the direct voltage. But they cannot interrupt a current greater than a fraction of one ampere without suffering a slight damage. Due to the periodical operation of the switches (they must each operate 60 times per second in a 60 cycle system), the slight damage to the contact, if they are called upon to interrupt any substantial current soon accumulates to a total destruction of the contact surface.

Another limitation is the inrush current after closing the contact. A contact does not close instantly. During the closing, the contacts touch very lightly over a small area thus providing a high resistance. As the contacting area and pressure increases, the contact resistance is correspondingly reduced. The time required for this phenomenon is twenty to thirty microseconds. If a high current is permitted during this interval, the narrow contact area will melt and thus be the cause of transfer of metal. Furthermore, the contact might rebound partially or totally after approximately one hundred microseconds. If the reverse motion is strong enough to reduce the contact pressure appreciably, some more transfer of metal will ensue. The transfer of metal will again be the cause of destruction because it is cumulative. To use such a switch in a mechanical rectifier, without any additional protective equipment will immediately result in its destruction.

To prevent such damage, saturable commutating reactors are inserted in series with the contacts. These reactors have a substantially square shaped, so-called hysteresis loop which present high impedance at low current and thus limit the inrush current after closing, and the residual current before opening, to a sufficiently low value to warrant a satisfactory performance for many billion operations.

The rectifier contacts are arranged to open during the interval just after the current passes through zero. At this time, the hysteresis loop is very steep, the rate of change of flux very large and accordingly, the reactance of the saturable reactor very large compared to a normal load. The amplitude of the current flowing in the system instead of changing in accordance with the normal sinewave is, therefore, held at a comparatively low value during the switching interval.

However, due to inevitable imperfections of the core material, the magnetizing current of the saturable reactor is not constant during flux change of the saturable reactor. Furthermore, this magnetizing current, even though it is only a small fraction of the load current, is far too large for a contact to break repeatedly.

Hence, if the variable magnetizing current cannot be interrupted by the switching contact, it must be supplied to the saturable reactor by some auxiliary means by passing the switching contacts, thereby reducing the contact current during the switching interval.

Various methods (pre-excitation) of reducing this magnetizing current have been used. Basically, they have functioned to increase the magnetizing current and straighten it by means of a transient current flowing in an inductor capacitor circuit and a resistor capacitor circuit connected in parallel across the commutating reactor winding. The aggregate magnetizing current is then compensated by means of an A.-C. or D.-C. bias.

This type system is shown in United States Patent No. 2,693,569, assigned to the assignee of the instant invention.

In principle, this meant trying to compare a current which is a function of time (the oscillatory current) against a current which is a function of flux change (the magnetizing current). The main limitation is that for different speeds of magnetization (due to different driving voltages at different values of voltage regulation), the change in shape of the magnetizing current is different than the change in shape of the transient current. Then the residual current, which is the difference between all the compensating currents the magnetizing current, is small only for one particular speed of magnetization, and large for all other speeds.

Obviously, a matching is needed which is always true independently of time or speed of magnetization.

The principle of my invention is to use a compensation of the same physical kind of non-linearity as the commutating reactor, but in an opposing sense. A circuit supplying the non-linear bias will contain non-linear elements similar to the commutating reactor. By doing this, we can compare the current against flux change relation of the commutating reactor with another current against flux change relation of the compensating circuit, and thereby obtain a matching which is always true independently of time.

Flux change can be plotted against time with the following law connecting these two variables:

$$d\Psi = e \cdot dt$$

where:

$d\Psi$=change of flux linkages in commutating reactor
$dt$=change of time
$e$=voltage applied to commutating reactor $e$ is variable with time, depending on the part of the step observed, position of the step (given by voltage regulation, overlap, frequency etc.) and impressed voltage from the power supply. Therefore, $e$ is essentially variable and usually unknown.

For the case of the pre-excitation circuit using an inductance capacitance and resistance capacitance circuit.

$$i_c = i_m + i_{lc} + i_{rc}$$

where $i_c$=compensation current
$i_m$=magnetizing current (a function of $d\Psi$)
$i_{lc}$=transient current in L.-C. circuit
$i_{rc}$=transient current in R.-C. circuit $i_{lc}$ and $i_{rc}$ functions of the time $t$. Therefore in view of the law $d\Psi=e\cdot dt$ $i_c=i_m$ (a function of $\Psi$)$+(i_{lc}i_{rc})$ (a function of time) can be satisfied for one voltage $e$ only. For the new circuit proposed in this disclosure, we have:

$$i_m=i_r+i_c \text{ or } i_r=i_m-i_c$$

Where $i_r$ is the residual current (to be very small or zero). Since $i_m$ and $i_c$ are made to be both functions of $\Psi$, $i_r$ can be made small or zero for any $e$.

Accordingly, the primary object of my invention is to provide a novel auxiliary circuit to supply the magnetizing current of a commutating reactor such that the remaining current that is to be carried by the contacts of the mechanical rectifier becomes negligible for all values of voltage regulation.

Another object of my invention is to provide a magnetizing current compensation circuit for saturable reactors whose current-flux change relation is compared to the current-flux change relation of the saturable reactor.

Another object of my invention is to provide a non-linear compensation of the same physical kind of non-linearity of a saturable reactor.

Another object of my invention is to supply a magnetizing current compensation circuit to a saturable reactor such that the difference between the magnetizing current of the saturable reactor and the compensating current is very small or zero throughout the unsaturated interval irregardless of the magnetizing speed of the saturable reactor.

Another object of my invention is to match the current-flux change relation of a saturable reactor with a plurality of compensating non-linear elements, each non-linear element active for given sequential intervals of flux change of the saturable reactor.

These and other objects of my invention will appear more fully in the detailed description of my invention in connection with the drawings in which.

Figures 6, 7, 8:
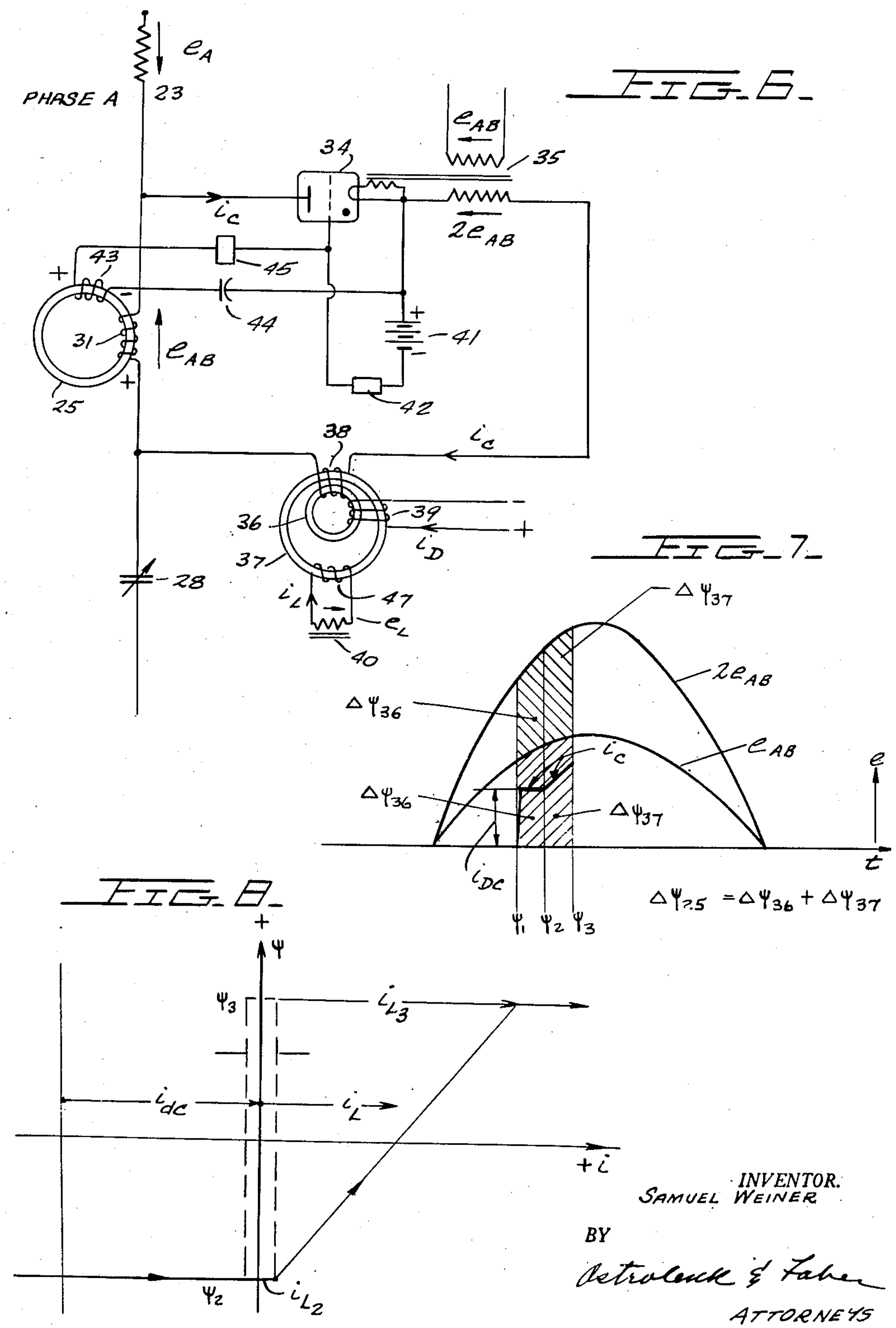
Figure 6 shows my novel non-linear compensating circuit in conjunction, one phase of the rectifier of Figure 1.

Figure 7 indicates the relationship between flux change, current, voltage and time for the circuit of Figure 6 under ideal conditions.

Figure 8 indicates further relationships between current and flux in conjunction with Figure 6.

Figure 9:
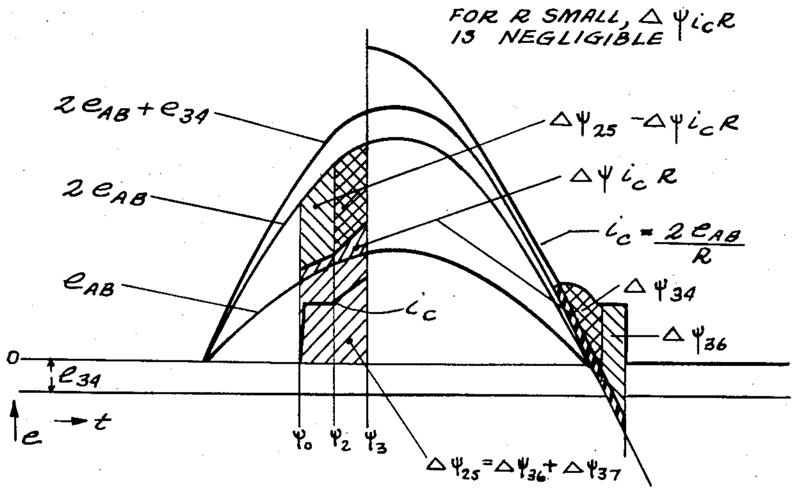

Figure 9 indicates the relationships of Figure 8 for practical conditions.

Figure 10:
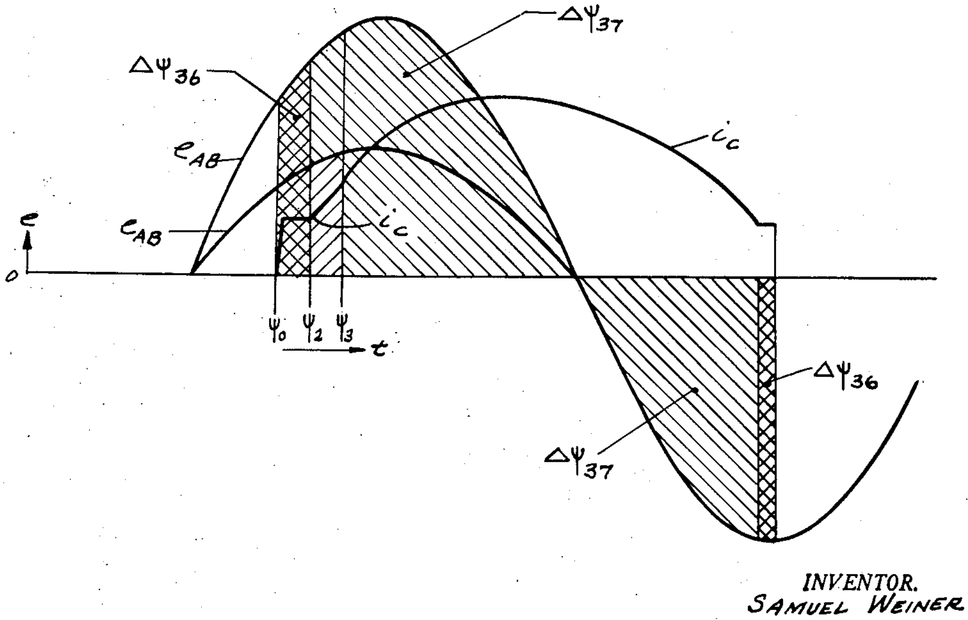

Figure 10 shows the compensating current flux and flux changes as a function of time for a full cycle.

Figures 11, 12:
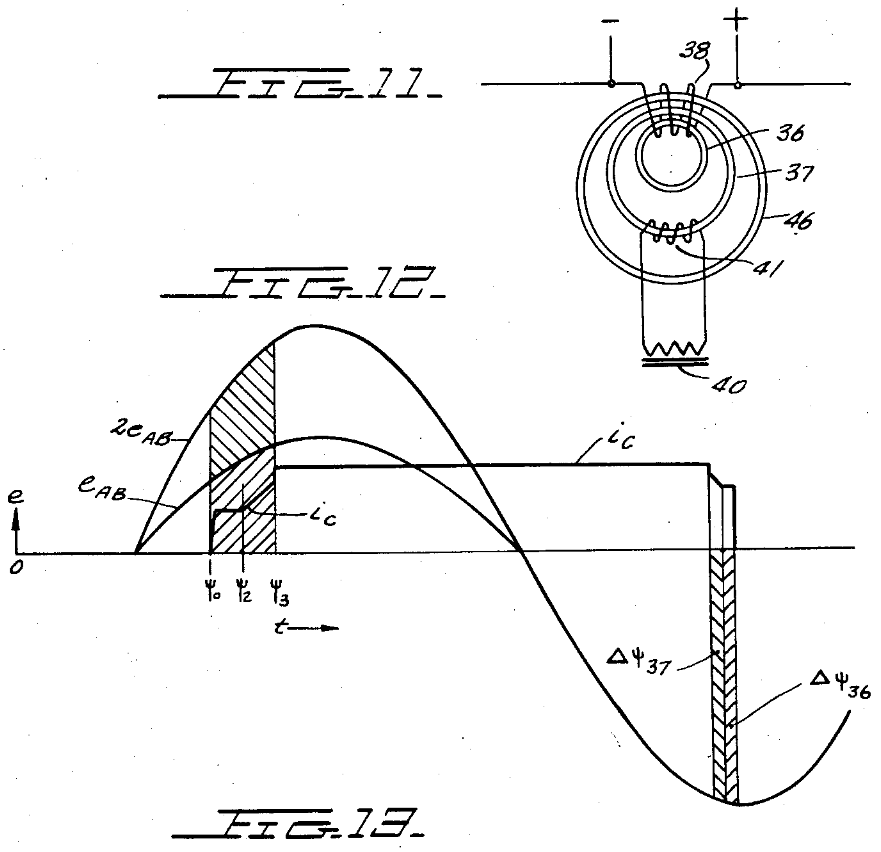

Figure 11 shows another embodiment of Figure 6.

Figure 12 shows the voltages and currents of Figure 12 as a function of time.

Figure 13:
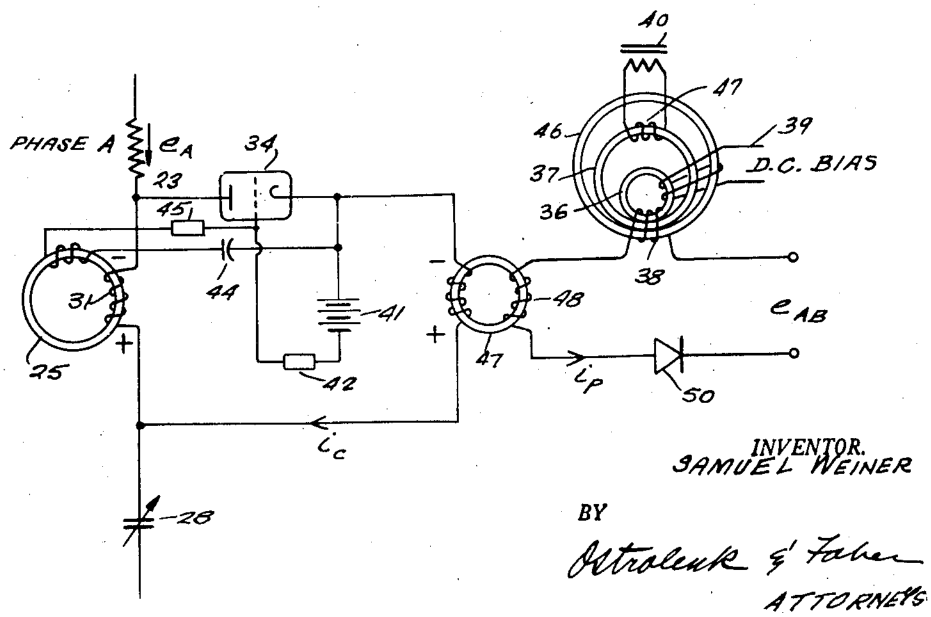

Figure 13 shows still another embodiment of my novel compensating circuit.

Figure 14:
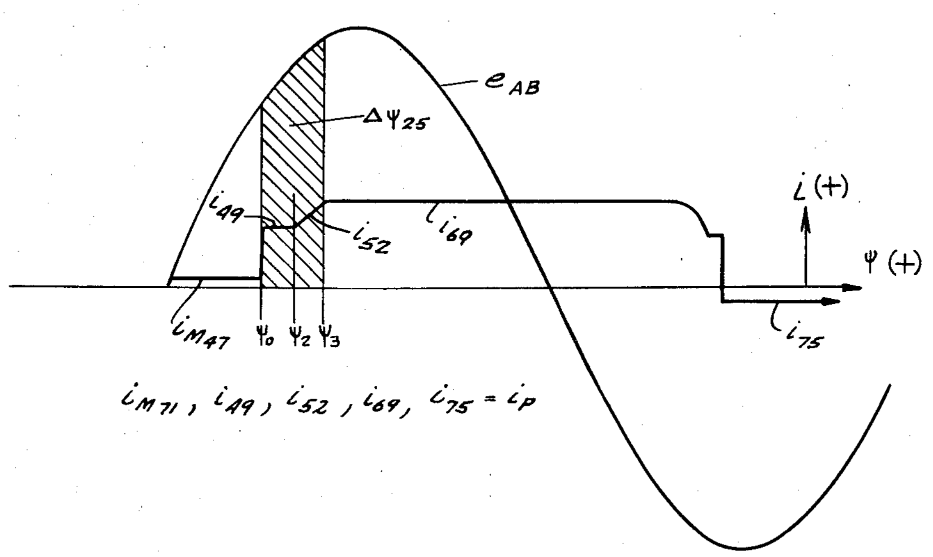

Figure 14 shows current-voltage relations as a function of time for the embodiment of Figure 14.

Figure 15:
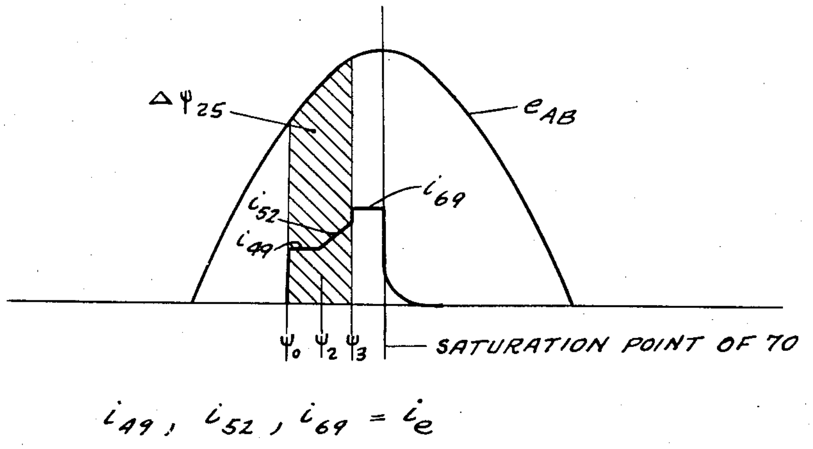

Figure 15 shows still other current-voltage relations as a function of time for the embodiment of Figure 14.

In the following description, I show my novel compensating circuit with reference to a mechanical rectifier. It should be noted however, that this novel circuit can be used in any application whereby a saturable type reactor is used in conjunction with an electrical contact to provide low current switching for the contact. Furthermore, this novel compensating circuit can be used in conjunction with any non-linear reactor in which it is desired to make the magnetizing current through a main coil very small or zero for the interval during its unsaturated period.

Figure 1:
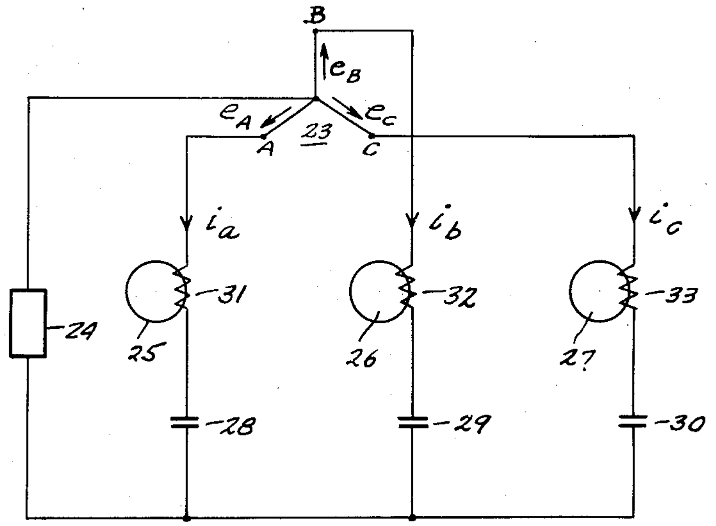
Figure 1 shows a simple three phase half wave mechanical rectifier circuit to which my novel compensation circuit may be applied.

Referring to Figure 1, I have shown a simplified diagram of a three phase half wave mechanical rectifier circuit to which my novel compensating circuit can be applied. In this figure, 23 is a three phase power supply. The commutating reactor cores 25, 26 and 27 are shown with their main windings 31, 32 and 33 respectively. In series with each commutating reactor 25, 26 and 27 are contacts 28, 29 and 30. The load is shown as 24. The contacts 28, 29 and 30 are driven by a synchronous motor (not shown) in such a manner that when the commutating reactor is unsaturated, the contact will be either making or breaking. That is, the contact always makes or breaks the magnetizing current of the commutating reactor. The operation of a synchronous motor of this type is described in copending application Serial No. 307,842, filed September 4, 1952, now Patent No. 2,731,530.

Figures 2, 3:
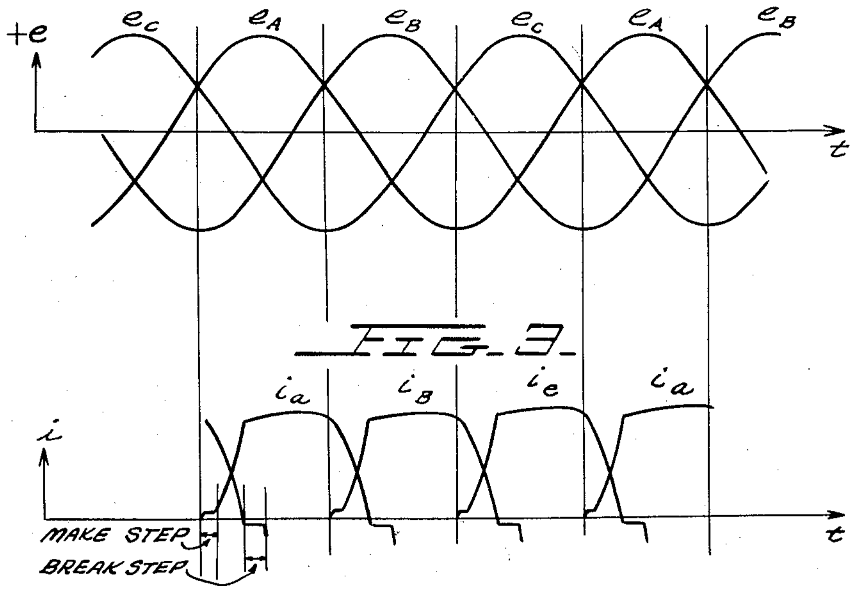
Figure 2 shows the transformer phase voltages for the circuit of Figure 1.
Figure 3 is a diagram of the D.-C. output current of the rectifier of Figure 1 plotted on a time base common to Figure 2.

Figure 2 shows the transformer voltages $e_A$, $e_B$, $e_C$ as referred to the circuit of Figure 1.

Figure 3 shows the load current or the contact current for each phase $i_A$, $i_B$, and $i_C$. Once again, these currents correspond to the circuit of Figure 1. The currents $i_A$, $i_B$ and $i_C$ during the intervals marked make step and break step, are the magnetizing currents passed by the commutating reactors 25, 26 and 27 when these reactors are unsaturated.

Furthermore, the contacts 28, 29 and 30 must open and close on this appreciable current. My novel circuit is directed towards a means to decrease the value of this magnetizing current, thus allowing the contacts to operate on a current which is very small or zero.

Figure 4:
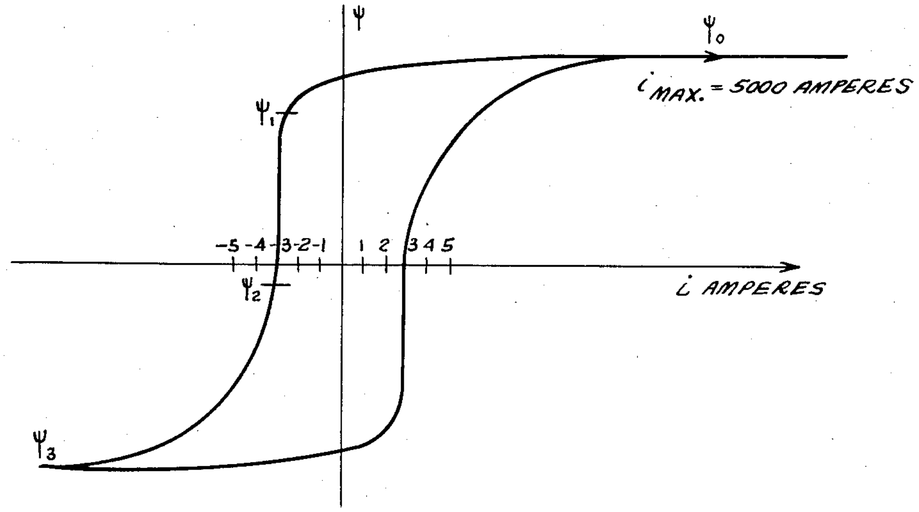
Figure 4 shows the current-flux relationship of the commutating reactors of Figure 1.

The current-flux characteristic of the commutating reactors 25, 26 and 27 is shown in Figure 4. This characteristic is merely a blown up detail of the current conditions during the make and break step intervals of Figure 3. The shape of the curve, hence the current at any time during the flux change is characteristic of the core material used and the construction of the reactor. In mechanical rectifiers, the characteristic curve Figure 4 for commutating reactors is such that the average magnetizing current during the flux change interval can be as high as 10 amperes. As will be shown hereinafter, my novel circuit will supply this magnetizing current having the required non-linear characteristic, thus allowing the contacts 28, 29 and 30 to operate on a very small current.

Figure 5:
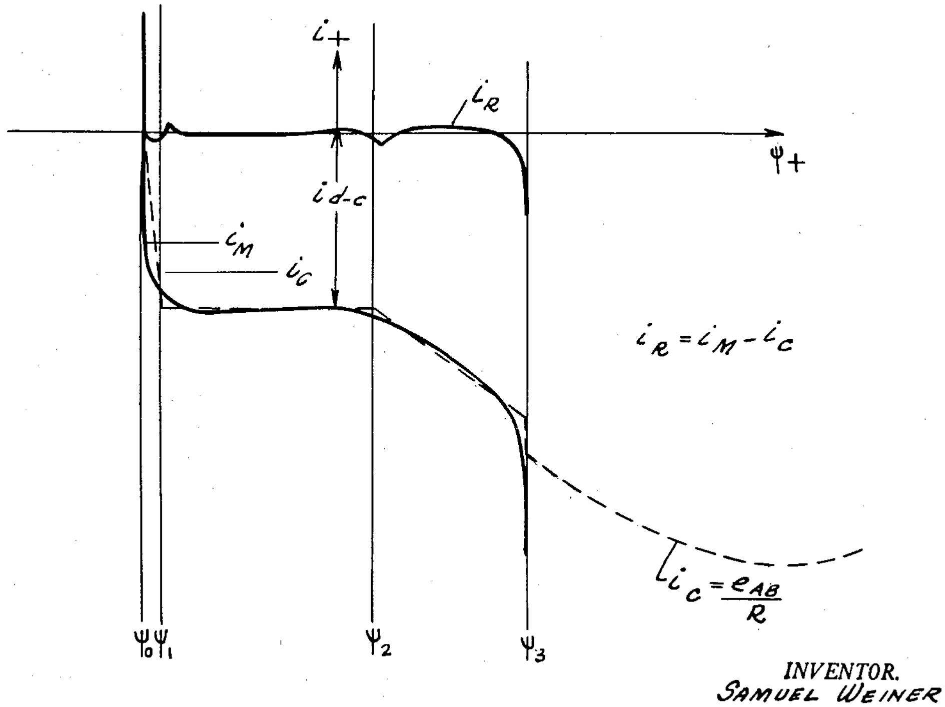
Figure 5 shows the flux-current relationship for the magnetizing current of commutating reactors, the residual contact current, and the compensating current.

Figure 5 repeats the right hand side of Figure 4 and reverses the ordinate and abscissa to conform to normal convention. In this figure, the current $i_m$ shown as a solid line is the magnetizing current of the commutating reactors 25, 26 and 27 during the break interval shown in Figure 3. Without any compensation, this relatively high current would have to be broken by the contacts 28, 29 and 30.

If, however, a compensating current of the form shown as the broken line $i_c$ could be supplied from an auxiliary source, then the contact would break only the small residual current being the difference between the magnetizing current required by the commutating reactor, and the compensating current $i_c$. This residual current is shown in Figure 5 as $i_R$, and is a current of negligible magnitude throughout the complete flux change of the reactor.

A closer examination of Figures 4 and 5 reveals the following: In Figure 5, immediately after $\Psi_0$, the point at which commutating reactors 25, 26 and 27 unsaturate, the compensation current $i_c$ rises sharply. By making this rise equivalent to the sharp decrease of $i_m$, (the small flux change corresponding to the interval from $\Psi_0$ to $\Psi_1$), we can get a very small residual current almost as soon as the flux starts to change. During the flux change from $\Psi_1$ to $\Psi_2$, the magnetizing current is constant, and this is matched by the constant part of the compensation current $i_c$. Finally when the current during the flux change from $\Psi_2$ to $\Psi_3$ decreases the compensation current $i_c$ rises, almost in the same manner. At $\Psi_3$ the commutating reactor saturates and the compensation current is no longer effective. Thus, for the major part of the flux change of the commutating reactor, $\Psi_0$ to $\Psi_3$, the application of a compensating current $i_c$ which varies with the flux change as the current $i_0$ of Figure 5, will result in a residual current $i_R$ flowing through the associated contact which is very small for the complete flux change of the commutating reactor.

An even closer match, hence a smaller residual current, could be obtained by using more steps for the compensation current $i_c$ of Figure 5.

It should be noted that the same principle can be applied during the make process.

A circuit that will supply the compensation current $i_c$ discussed in conjunction with Figure 5 is shown in Figure 6. For purposes of simplicity, my novel compensation circuit is shown applied only to phase A of the three-phase half-wave rectifier of Figure 1. The extension of this circuit to phases B and C would be apparent to anyone skilled in the art. In fact, the extension of the compensating circuit to any type of mechanical rectifier, electromagnetic rectifier or any system using series saturable reactors for contact protection will be apparent to anyone skilled in the art and aware of my novel circuit.

In the compensating circuit of Figure 6, gas filled triode 34 triggers the circuit into operation, and an auxiliary transformer 35 supplies energy to the compensation circuit.

The auxiliary transformer 35 is connected to the main transformer 23 in such a way that the voltage it induces in the compensating circuit will be 180 degrees out of phase with the voltage across coil 31 when the commutating reactor 25 is unsaturated for the break step. Furthermore, the magnitude of the voltage induced by transformer 35 will be twice the voltage $e_{AB}$ appearing on winding 31.

Elements 36 and 37 are non-linear reactor cores made of square loop material and of very small magnetizing current with respect to the magnetizing current of the commutating reactor 25. The two non-linear elements 36 and 37 have a common winding 38. As is well known in the art, this is equivalent to the two non-linear elements 36 and 37 having separate windings and being in series, but the embodiment used in Figure 6 shows the more economical arrangement of using a common winding 38. A stabilized D.-C. supply (not shown) biases the cores 36 and 37 to a predetermined value by means of the D.-C. windings 39. This bias can be common to both cores or two separate biases can be used. An inductor 40 is connected to the non-linear reactor 37 by means of winding 47. The complete circuit is then connected across the commutating reactor winding 31, or, if desired, can be connected to an auxiliary winding on commutating reactor 25. The battery 41 serves to bias the grid of tube 34 through resistor 42 and a second grid bias is made from signal winding 43 through condenser 44 and resistor 45.

The operation of the circuit of Figure 6 is as follows: Immediately before the break step, the compensation circuit is inactive since the tube 34 has not yet fired. However, the instant the commutating reactor 25 unsaturates to initiate the break step the voltage $e_{AB}$ falls across winding 31 and 43 in the direction shown in Figure 6. The grid of the gas tube 34 immediately becomes positive since it sees the positive polarity of winding 43. This tube then fires immediately, thus initiating the action of the compensating circuit.

Therefore, the compensating circuit is activated almost immediately upon the beginning of the break step. This corresponds to the point $\Psi_0$ of Figure 5.

During the interval $\Psi_0$ to $\Psi_1$ of Figure 5, cores 36 and 37 are maintained saturated by their D.-C. bias 39. Therefore, when the tube 34 fires at $\Psi_0$, a sharply rising current flows due to the voltage $2e_{AB}-e_{AB}$. This is shown in Figure 5 as $i_c$ in the interval $\Psi_0$ to $\Psi_1$.

At $\Psi_1$, core 36 unsaturates. In the interval $\Psi_1$ to $\Psi_2$ the core 36 remains unsaturated and core 37 remains saturated. The current during this interval therefore is maintained constant by the magnetizing current of core 36, and its magnitude is given by the D.-C. compensations of bias 39. This is the current $i_c$ in the interval $\Psi_1$ to $\Psi_2$ of Figure 5.

It is important to note that no matter what value the commutating voltage $e_{AB}$ has due to voltage regulation of the rectifier system, the core 36 will always saturate at the same value of flux change on commutating reactor 25. That is, the constant compensation current held by reactor 36 will flow for the same interval of flux change of the commutating reactor 25. Therefore, by matching the flux change of core 36 to an interval of flux change on the commutating reactor 25, the compensating current in the interval $\Psi_1$ to $\Psi_2$ will remain true regardless of the voltage regulation of the rectifier.

This operation is further borne out in Figure 7. Figure 7 shows the voltages $e_{AB}$ of transformer 35 and the voltage $e_{AB}$ of the commutating reactor 25. Since these voltages are in opposition, the voltage across the coil 38 when reactor 36 is unsaturated in the interval $\Psi_1$ to $\Psi_2$ will be $e_{AB}$. $\Delta\Psi_{36}$ of Figure 7 is the volt second rating of core 36. If the voltage $e_{AB}$ is changed, the interval $\Psi_1$ to $\Psi_2$ will have to change to maintain the volt seconds constant. If now, due to voltage regulation, the voltage $e_{AB}$ on commutating reactor 25 changes, then the voltage on coil 38 changes identically. Hence the same change in time of unsaturation $\Psi_1$ to $\Psi_2$ on commutating reactor 25 is seen by the core 36, thus maintaining true compensation in the interval $\Psi_1$ to $\Psi_2$.

At $\Psi_2$, the core 36 saturates and core 37 unsaturates. Since core 37 has a winding 41 short circuited by the inductor 40, the compensation current $i_c$ in the interval $\Psi_2$ to $\Psi_3$ is an increasing current. Figure 8 shows the increasing current showing its magnitude at $\Psi_2$ as $i_{L2}$ and its greater magnitude at $\Psi_3$ as $i_{L3}$. The slope of the compensating current during this interval can be adjusted to match the magnetizing current of Figure 5 merely by the adjusting of inductance choke 40.

At $\Psi_3$, reactor 37 and commutating reactor 25 unsaturates. It should be noted that similar to the action of core 37 in the interval $\Psi_1$ to $\Psi_2$, reactor 37 allows passage of current for an interval $\Psi_2$ to $\Psi_3$ which is always the same proportion of commutating flux change. This is clearly shown in Figure 7. With core 36 saturated and core 37 unsaturated during the interval $\Psi_2$ to $\Psi_3$, the voltage $e_{AB}$ falls across winding 38. The unsaturated core 37 is constructed to have a volt second rating $\Delta\Psi 37$ which is proportional to a part of the volt second rating of the commutating reactor. If, due to a change in voltage regulation of the rectifier, the voltage $e_{AB}$ changes, then the interval $\Psi_2$ to $\Psi_3$ will change in the exact way that the corresponding interval on the commutating reactor 25 changes. Furthermore, the change in voltage will cause the slope of the current $i_c$ in the interval $\Psi_2$ to $\Psi_3$ to change in such a way as to maintain accurate compensation of the magnetizing current.

After the saturation at $\Psi_3$ of the commutating reactor 25 and saturable reactor 37, the current $i_c$ will be limited by the small circuit resistance and will be in phase with $2e_{AB}$. When this voltage reverses, the gas filled triode 34 will extinguish. The D.-C. bias will then reverse the flux of reactors 49 and 52, and the circuit is ready to work for the next cycle.

The operation of Figure 6 as mentioned above can be summarized as follows:

(1) When the commutating reactor 25 unsaturates the gas filled triode 34 fires and activates the operation of the circuit.

(2) In the interval from $\Psi_0$ to $\Psi_1$ the compensation current of Figure 5 rises freely.

(3) At $\Psi_1$ the freely rising current rise is high enough to overcome the bias of reactor 36 and this reactor unsaturates.

(4) The reactor 36 maintains the current constant until it saturates at $\Psi_a$.

(5) At $\Psi_a$ reactor 36 saturates and reactor 37 unsaturates.

(6) The compensation current from $\Psi_a$ to $\Psi_3$ rises since unsaturated reactor is short circuited by an inductor 40. The value of the inductance 40 determines the slope of the rising current.

(7) At $\Psi_3$ the commutating reactor 25 and reactor 37 saturate.

(8) The compensation current rise is limited by the small resistance of the compensation circuit. This current is in phase with voltage $2e_{AB}$, and when the voltage reverses, the tube 34 is extinguished.

(9) The D.-C. bias reverses the flux of cores 36 and 37 and the circuit is ready for the next operation.

An important feature included in this operation is that no matter how the commutating voltage $e_{AB}$ changes due to outside influence, each reactor 36 and 37 will remain unsaturated for a given constant portion of the total flux change of the commutating reactor 25. The slope of the magnetizing current from $\Psi_2$ to $\Psi_3$ in Figure 5 will change for a change in $e_{AB}$ but the slope of the compensating current will also change in the same way during this interval. Therefore, the compensating current will be correct regardless of outside influence such as regulation.

When the commutating reactor 25 unsaturates under a higher or lower voltage, the magnitude of the magnetizing current increases or decreases slightly. However, it is possible to make the D.-C. bias magnitude a function of the voltage $e_{AB}$, thus automatically compensating for this difference.

It should be further noted that in the circuit of Figure 6, it would be possible to use a plurality of non-linear elements and associated chokes. That is, each non-linear element would cover a smaller range of flux change. By doing this, the magnetizing current of commutating reactor 25 could be matched as close as is desired.

In the above explanation, the voltage drop on the circuit was assumed to be negligible. For the practical case, however, the voltage drop on the gas tube 34 and the voltage drop due to the circuit resistance should be considered. Since the drop on the gas tube 34 will be practically constant, it can be compensated simply by increasing the voltage of 35 to $2e_{ab}+e_{34}$, where $e_{34}$ is the voltage drop on the tube 34, (the new voltage flux relations are shown in Figure 9). The voltage drop on the circuit resistance R will vary with $i_c$R. This variable voltage drop absorbs a certain volt second area $\Delta\Psi i_c R$ as shown in Figure 13. However, the resistance R is so small that the basic flux change relations between the commutating reactor 25 and the transductor 36 and 37 will not be disturbed. That is, $\Delta\Psi i_c R$ is very small compared to $\Delta\Psi_{25}$.

The main disadvantage of this circuit is that after $\Psi_3$ in Figures 5 and 7, the current $i_c$ will rise to a relatively high value since it is limited only by the small circuit resistance. This disadvantage can be overcome by several methods.

A first method to limit the peak current $i_c$ after $\Psi_3$, would be to allow the reactor 37 to remain unsaturated after the commutating reactor 25 saturates at $\Psi_3$. By so doing, the impedance of inductor 40 is kept in the circuit and helps limit the peak current of $i_c$ until the voltage reverses and the tube 34 extinguishes. This condition is shown in Figure 10 and the limited current $i_c$ is shown for a full cycle.

Still another method of limiting the rise of compensating current after $\Psi_3$ would be to put another transductor shown as 46 in Figure 11 into the circuit. In this case, transductor 37 would saturate at $\Psi_3$ as described initially. The transductor 46 will be biased to unsaturate at the current being carried at $\Psi_3$ or a little higher. This transductor 46 would then remain unsaturated until the voltage $e_{AB}$ reverses thus maintaining the compensating current at a relatively low constant value.

The compensation current $i_c$, maintained constant after $\Psi_3$ by transductor 46 is shown in Figure 12.

Another embodiment of my novel circuit is shown in Figure 13. In this circuit, transductors 36, 37 and 46 have been put in the primary side of the compensation circuit. Their function is the same as was described for the previous circuits. The transformer 35 of the previous circuits has been replaced by a transformer whose iron core is the same type as was used for transductors 36, 37 and 46. Transformer 35 is designed to remain unsaturated for at least the longest time the commutating reactor 25 will remain unsaturated.

Figure 14 shows the current conditions in the primary side of the compensation circuit and Figure 15 shows the current conditions in the secondary of the compensation circuit.

When the commutating voltage $e_{AB}$ becomes positive, a current will try to rise through windings 38, 48 and the valve 50. However, since the tube 34 has not fired yet (the break step has not yet started) winding 48 is the winding of saturable type reactor or transductor. Therefore, only the small magnetizing current of the reactor 46 can flow. This current is shown as $i_m$47 in Figure 14. When the commutating reactor 25 unsaturates the gas tube 34 fires and transductor 47 becomes a transformer. Hence, the current $i_p$ climbs immediately to the D.-C. bias of transductor 36. The following events until the break step is over, are the same as described before, since the current in the primary $i_p$ will be reflected into the secondary of transformer 47 as $i_c$. These currents are shown in Figures 14 and 15 for $i_p$ and $i_c$ respectively.

When the break step is over, the currents $i_c$ and $i_p$ are limited by the bias of transductor 46 as before. However, when the transductor 70 saturates, the current $i_c$ will die off as shown in Figure 15. (Since the driving voltage is removed from the circuit.) Furthermore, $i_c$ will decrease rapidly because of the relatively high resistance of gas tube 34. When $i_c$ reaches a low enough value, the gas tube 34 will then stop firing.

The current $i_p$ will continue to flow, limited by the D.-C. bias of 46 until the current reverses as shown in Figure 19. Valve 50 will then block the current flow until the voltage $e_{AB}$ becomes positive for the next cycle.

Note that the current $i_c$ shown flowing through tube 34 in Figure 15 will have a small average value. For this reason a much smaller tube can be used with this circuit.

In the foregoing I have described my invention only in connection with the preferred embodiments thereof. Many variations and modifications of the principles of my invention within the scope of the description herein are obvious. Accordingly, I prefer to be bound not by the specific disclosure herein but only by the appended claims.

I claim:

1. In a compensation circuit for a saturable reactor, in combination, a triggering means; a voltage source; a first non-linear element; a second non-linear element; said triggering means, voltage source and non-linear elements connected in series, one end of said series connection connected to one end of a coil of said saturable reactor, the other end of said series sonnection connected to the other end of said saturable reactor coil; said voltage source constructed to impress a voltage 180° out of phase and having approximately twice the magnitude of the voltage appearing on said saturable reactor coil.

2. In a compensation circuit for a saturable reactor, in combination, a triggering means; a voltage source; a first non-linear element; a second non-linear element; said triggering means, voltage source and non-linear elements connected in series, one end of said series connection connected to one end of a coil of said saturable reactor, the other end of said series connection connected to the other end of said saturable reactor coil; said triggering means constructed to activate said compensation circuit when said saturable reactor unsaturates.

3. In a compensation circuit for a saturable reactor; in combination; a gas filled triode, a voltage source, a first non-linear element, a second non-linear element; said voltage source, first non-linear element, second non-linear element, the plate and cathode of said gas filled triode connected in series; one end of said series connection connected to one end of a coil of said saturable reactor; the other end of said series connection connected to the other end of said saturable reactor coil; means to vary the grid cathode potential of said gas filled triode to effect firing of said gas filled triode; said means being a first negative grid cathode bias circuit, a second grid cathode circuit connected to an auxiliary coil of said saturable reactor to impress a positive potential on the grid of said gas filled triode when said saturable reactor unsaturates.

4. In a compensation circuit for a saturable reactor, in combination, a triggering means; a voltage source; a first non-linear element; a second non-linear element; said non-linear elements having a common winding, said triggering means, voltage source and non-linear elements connected in series, one end of said series connection connected to one end of a coil of said saturable reactor the other end of said series connection connected to the other end of said saturable reactor coil; said voltage source constructed to impress a voltage 180° out of phase and having approximately twice the magnitude of the voltage appearing on said saturable reactor coil; said first non-linear element comprising a first saturable type reactor having a first D.-C. bias, said second non-linear reactor comprising a second saturable type reactor having a second D.-C. bias, said second non-linear reactor being short circuited by an inductor; said first non-linear element constructed to remain unsaturated for a given percentage of the total flux change of said saturable reactor, said second non-linear element constructed to thereafter remain unsaturated for at least the remaining percentage of flux change of said saturable reactor.

5. In a compensation circuit for a saturable reactor; in combination, a gas filled triode, a voltage source, a plurality of saturable reactors, said gas filled triode, voltage source and each of said plurality of saturable reactors forming a series circuit, said series circuit closed at each end by a winding of said first mentioned saturable reactor; each of said plurality of saturable reactors having a D.-C. bias and a short circuiting choke, each of said saturable reactors constructed to remain sequentially unsaturated for a given portion of the flux change of said first mentioned saturable reactor.

6. In a compensation circuit for a saturable reactor; in combination; a gas filled triode, a voltage source, a first non-linear element, a second non-linear element; said voltage source, first non-linear element, second non-linear element, the plate and cathode of said gas filled triode connected in series; one end of said series connection connected to one end of a coil of said saturable reactor; the other end of said series connection connected to the other end of said saturable reactor coil; means to vary the grid cathode potential of said gas filled triode to effect firing of said gas filled triode; said means being a first negative grid cathode bias circuit, a second grid cathode circuit connected to an auxiliary coil of said saturable reactor ot impress a positive potential on the grid of said gas filled triode when said saturable reactor unsaturates; said voltage source constructed to impress a voltage 180° out of phase and having approximately twice the magnitude of the voltage appearing on said saturable reactor coil.

References Cited in the file of this patent

UNITED STATES PATENTS

| | | |
|---|---|---|
| 2,084,899 | Edwards | June 22, 1937 |
| 2,181,152 | Rolf | Nov. 28, 1939 |
| 2,193,421 | Janetschke | Mar. 12, 1940 |
| 2,557,740 | Goldstein et al. | June 19, 1951 |
| 2,758,271 | Rolf | Aug. 7, 1956 |
| 2,777,108 | Read et al. | Jan. 8, 1957 |
| 2,795,753 | House | June 11, 1957 |